United States Patent Office 2,987,372
Patented June 6, 1961

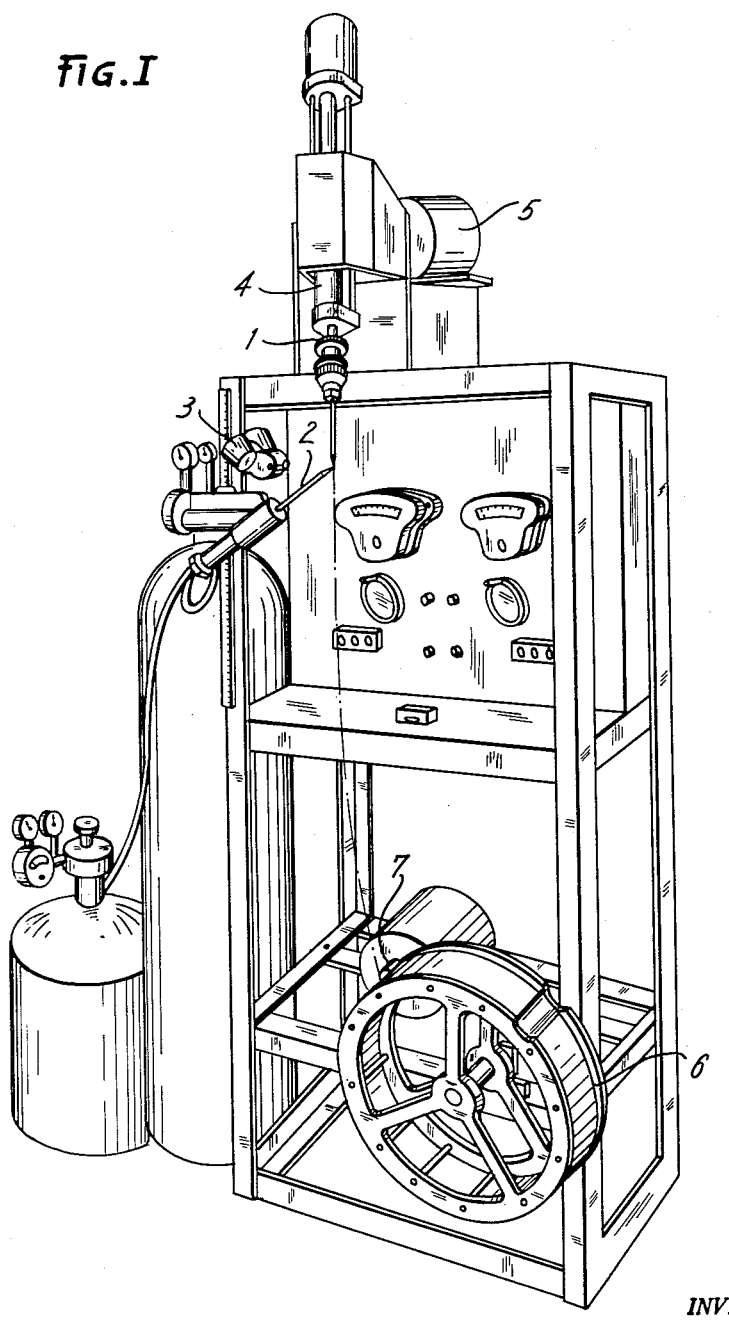

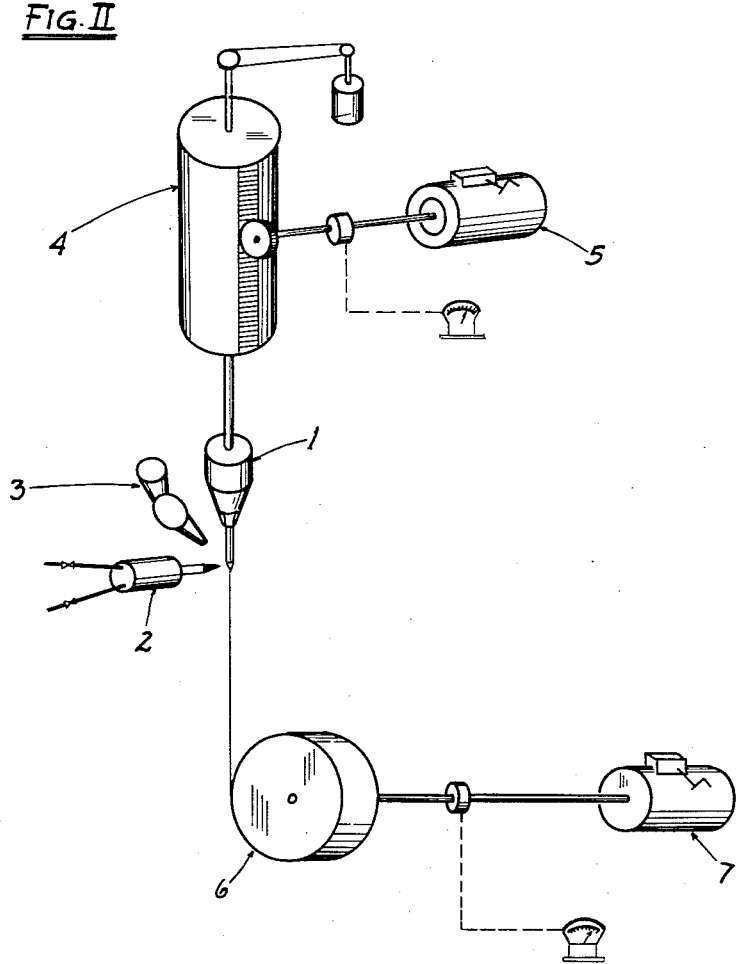

2,987,372
QUARTZ MICRO-TUBING MANUFACTURE
Richard G. Olt, Dayton, Howard R. Du Four, New Carlisle, and Marion I. Gray, Dayton, Ohio, assignors to Monsanto Chemical Company, St. Louis, Mo., a corporation of Delaware
Filed Feb. 9, 1959, Ser. No. 792,146
4 Claims. (Cl. 18—54)

This invention relates to improvements in the manufacture of quartz micro-tubing.

Quartz micro-tubing has been found to be useful for a variety of purposes, for example for separation of low molecular weight gases from higher molecular weight gases. It has been found that it is particularly useful in separating helium from natural gas streams (Chemical and Engineering News, p. 42, May 12, 1958), the helium diffusing through the walls of the micro-tubing and collected.

In prior methods for manufacturing quartz micro-tubing a length of quartz-stock tubing was heated to its plastic range and the micro-tubing drawn by hand. However, by such a method the diameter (both inside and outside diameter) of the drawn micro-tubing could be predicted only within wide limits of error. That is to say the drawing of micro-tubing of desired diameter and length was a matter of skill and chance, involving a lengthy process of calibration and selection of micro-tubing for desired diameter and length as well as strength.

In accordance with this invention there has been found a method of producing quartz micro-tubing of predetermined outer diameter $D_m$ and inner diameter $d_m$, or of wall thickness $T_m$ wherein $$T_m = D_m - d_m$$

efficiently and at a uniform rate from quartz-stock tubing of outer diameter $D_t$ and inner diameter $d_t$, or of wall thickness $T_t$, wherein $$T_t = D_t - d_t$$

which comprises advancing rectilinearly quartz-stock tubing of outer diameter $D_t$ and inner diameter $d_t$ at a velocity $V_t$ to a fusion zone, the said stock tubing being sealed at its rear end and having a drawing fiber sealed in the forward (or advancing) end, fusing said advancing quartz-stock tubing in said fusion zone at a point just above the seal of the forward end, drawing said fiber from said fusion zone thereby attenuating said stock tubing, and drawing said attenuated stock tubing at a velocity $V_m$, the said velocities and the said diameters having the following relationship $$V_m = \left[ \frac{D_t^2 - d_t^2}{D_m^2 - d_m^2} \right] V_t$$

wherein $V_m$ and $V_t$ are expressed in inches per minute and wherein $D_t$, $d_t$, $D_m$ and $d_m$ are expressed in inches.

As is obvious from the foregoing equation knowing the inner and outer diameters of a length of quartz-stock tubing and the desired inner and outer diameters of micro-tubing to be produced one can calculate the required velocities of the feed and of the draw, respectively, which are necessary to provide the desired micro-tubing and feed the stock tubing and draw the micro-tubing accordingly by mechanical means. In general the reduction in cross-sectional area of the wall of a length of stock tubing to that of the micro-tubing will not be more than a factor of 10,000.

In order to illustrate the process of this invention reference is made to the drawings, i.e. FIGURES I and II. In FIGURE I there is disclosed an apparatus for drawing quartz micro-tubing in accordance with the process of this invention; FIGURE II is a diagrammatic drawing of same.

The drawing of cylindrical-shaped micro-tubing having an outside diameter of 0.003 inch and an inside diameter of 0.002 inch from standard quartz stock-tubing having an 0.120 inch outside diameter and an 0.040 inch inside diameter is accomplished as follows: A fifteen (15) inch length of this standard stock tubing is mounted rectilinearly and vertically in a rotatable chuck 1 as shown in FIGURES I and II. The stock-tubing is caused to move downward at the desired rate by motion of a quill 4 and hence chuck 1. The upper end of the tubing is heat-sealed to entrap air in the tubing, which sealing assists in controlling the micro-tube wall thickness to a value which is commensurable with its outside diameter. The entrapped air also prevents the collapse of the drawn micro-tubing. A drawing fiber is then formed from the lower end of the tubing, the lower end of the tubing being restricted simultaneously. The free end of the drawing fiber is affixed to a rotatable cylindrical collection reel 6, so that the stock-tubing feed axis is tangent to the reel's axis. The chuck is rotated so that the torch 2 flame (mixture of oxygen and propane) uniformly heats the tubing at a point just above its lower sealed end. A binocular microscope 3 is employed to observe the proper location of the flame and heating of the stock tubing. The reel is rotate which starts to draw the stock tubing where it has been softened by the torch flame, and the rate of rotation of the reel is increased up to the predetermined velocity of the draw $V_m$ that is 5120 inches per minute. As the stock-tubing rotates in the chuck and the attenuated tube collects on the reel surface, the quartz-stock tubing is advanced to the fusion flame at an increasing rate up to the predetermined velocity $V_t$, that is 2 inches per minute. When these velocities i.e. $V_m$ and $V_t$ are realized concomitantly the reel face of the rotating drum is moved across the axis of the draw and 1200 feet of micro-tubing of outer diameter 0.003 inch and inner diameter of 0.002 inch is collected thereon upon feeding 6 inches of the stock tubing. The theoretical yield of the desired micro-tubing is 2560 feet per foot of the fed quartz-stock tubing. The reel shown in the figures is 50 inches in circumference and approximately 5 inches wide and is provided with a cylindrical stainless steel surface provided with stainless steel removable bands. The reel is mounted on a shaft containing a lead screw for moving the reel face across the axis of the draw. A variable motorized transmission 7 and speed indicator or tachometer is provided to turn the shaft. A similar variable motorized transmission 5 and speed indicator is provided to move the stock tubing toward the fusion zone by advancing the quill 4.

For fabrication of hollow, oval-shaped micro-tubing the same equipment and same conditions are used except that the chuck holding the stock tubing does not rotate and the heating of the stock tubing is accomplished by two torches which are directed onto the stock tubing from positions spaced 180° apart which results in flattening the tubing as it is drawn.

While it is preferred that the drawing of the micro-tubing be vertically downward as described above it may also be drawn horizontally. It is particularly preferred that the axis of the drawn micro-tubing and the axis of the feed stock tubing be the same, which axis be tangent or approximately tangent to the circumference of the collecting spool. While a reel such as that in the above illustration is preferred, any collecting spool can be employed.

Although it is preferred that the source of heat in the fusion zone be an ignited mixture of oxygen and a low molecular weight hydrocarbon such as propane or butane other sources of heat can be employed, e.g. an electrical heating device. It is necessary that the stock tubing be heated uniformly and it is particularly preferred in the preparation of cylindrical micro-tubing that it be rotated as it is being heated.

While the preferred method of attenuating the stock tubing is described above in the illustration it is to be understood that any of the means well known to those skilled in the art for attenuating can be employed, e.g. fusing a fiber or micro-tubing to the molten end and then drawing, and it is to be understood that the expression "having a drawing fiber sealed in the advancing end" embraces same.

What is claimed is:

1. The method of manufacturing quartz micro-tubing of outer diameter $D_m$ and inner diameter $d_m$ which comprises advancing rectilinearly a length of quartz-stock tubing of outer diameter $D_t$ and inner diameter $d_t$ at a velocity $V_t$ to a fusion zone, the said quartz-stock tubing being sealed at its rear end and having a drawing fiber sealed in its forward end, fusing said advancing stock tubing in said fusion zone at a point just above its sealed forward end, drawing said fiber from said fusion zone thereby attenuating said stock-tubing, and drawing said attenuated stock-tubing at a velocity $V_m$, the said velocities and the said diameters having the following relationship $$V_m = \left[\frac{D_t^2 - d_t^2}{D_m^2 - d_m^2}\right] V_t$$

wherein $V_m$, $V_t$, $D_t$, $D_m$, $d_t$ and $d_m$ are in consistent units.

2. The process of claim 1 wherein the advancing quartz-stock tubing is advanced rectilinearly and vertically downward.

3. The process of claim 1 wherein the advancing quartz-stock tubing is advanced rectilinearly and vertically downward and is rotated as it approaches the fusion zone.

4. The method of manufacturing cylindrical quartz micro-tubing of outer diameter $D_m$ and inner diameter $d_m$ which comprises advancing rectilinearly and vertically downward a rotating length of quartz-stock tubing of outer diameter $D_t$ and inner diameter $d_t$ at a velocity $V_t$ to a fusion zone, the said quartz-stock tubing being sealed at its rear end and having a drawing fiber sealed in its forward end, fusing said advancing stock tubing in said fusion zone at a point just above its sealed forward end, drawing said fiber from said fusion zone thereby attenuating said stock-tubing and drawing said attenuated stock-tubing at a velocity $V_m$, the said velocities and the said diameters having the following relationship $$V_m = \left[\frac{D_t^2 - d_t^2}{D_m^2 - d_m^2}\right] V_t$$

wherein $V_m$, $V_t$, $D_t$, $d_t$, $D_m$ and $d_m$ are in consistent units, collecting said microtubing on a rotating spool which spool is rotating at a rate sufficient to draw the microtubing at the velocity $V_m$, the vertical axis of the microtubing and the feed stock being the same and substantially tangent to the circumference of the collecting spool.

References Cited in the file of this patent

UNITED STATES PATENTS

| | | |
|---|---|---|
| 466,894 | McElroy | Jan. 12, 1892 |
| 1,298,463 | Corl et al. | Mar. 25, 1919 |
| 1,821,937 | Friedrich | Sept. 8, 1931 |
| 1,892,477 | Weber | Dec. 27, 1932 |
| 2,269,459 | Kleist | Jan. 13, 1942 |

FOREIGN PATENTS

| | | |
|---|---|---|
| 300,646 | Great Britain | Jan. 23, 1930 |

OTHER REFERENCES

Serial No. 196,776, application of Skaupy et al. (A.P.C.), published April 27, 1943 (abandoned).